US006943907B1

(12) United States Patent
Kim

(10) Patent No.: US 6,943,907 B1
(45) Date of Patent: Sep. 13, 2005

(54) PRINTER, IMAGE PRINTING SYSTEM TO WHICH THE PRINTER IS APPLIED, AND METHOD FOR PRINTING CONFIDENTIAL DOCUMENT

(75) Inventor: Yong-geun Kim, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/455,331

(22) Filed: Dec. 6, 1999

(30) Foreign Application Priority Data

Dec. 7, 1998 (KR) .................................. 98-53485

(51) Int. Cl.[7] ......................... G06K 15/02; G06F 3/12; G06F 13/00

(52) U.S. Cl. .................... 358/1.14; 358/1.15; 358/1.13

(58) Field of Search ............................. 358/1.14, 1.15, 358/1.16, 1.9, 1.13, 468, 438–441; 382/101, 382/115; 709/207, 224, 227–232, 240, 245; 710/31, 33, 44, 46

(56) References Cited

U.S. PATENT DOCUMENTS 4,768,767 A * 9/1988 Orr et al. ................. 270/58.01
5,562,351 A * 10/1996 Uematsu ...................... 400/68
5,673,373 A * 9/1997 Nosaki et al. .............. 395/114
5,970,228 A * 10/1999 Nezu .......................... 395/186
5,999,707 A * 12/1999 Taniguchi et al. .......... 395/114
6,104,498 A * 8/2000 Shima et al. ............. 358/1.14
6,160,629 A * 12/2000 Tang et al. .................. 358/1.1
6,307,640 B1 * 10/2001 Motegi ...................... 358/1.14
6,332,170 B1 * 12/2001 Ban ............................. 710/6

FOREIGN PATENT DOCUMENTS

| | | | |
|---|---|---|---|
| JP | 6-124177 | 5/1994 | ............ G06F 3/12 |
| JP | 7-98691 | 4/1995 | |
| JP | 7-125383 | 5/1995 | ............ B41J 29/00 |
| JP | 7-141132 | 6/1995 | |
| JP | 7-184068 | 7/1995 | ............ H04N 1/44 |
| KR | 1989-0015542 | 10/1989 | |

* cited by examiner

*Primary Examiner*—Douglas Tran
(74) *Attorney, Agent, or Firm*—Sughrue Mion, PLLC

(57) ABSTRACT

A printer, an image printing system to which the printer is applied, and a method for printing a confidential document are provided. The printer includes an input panel including a plurality of input keys, a controller for reading print type information sent through a communication interface together with print data and performing printing of a confidential print data file selected to be printed and received when a code that is the same as a secret code set in the received print type information is input through the input panel, and an engine controlled by the printer controller for printing an image corresponding to the print data to paper. According to the printer, the image printing system to which the printer is applied, and the method for printing the secret document, the printer performs printing only when the secret code input with respect to the confidential print data selected to be printed is the same as the previously set secret code. Accordingly, it is possible to prevent the confidential print matter from being exposed to others.

6 Claims, 4 Drawing Sheets

PRINTER, IMAGE PRINTING SYSTEM TO WHICH THE PRINTER IS APPLIED, AND METHOD FOR PRINTING CONFIDENTIAL DOCUMENT

BACKGROUND OF THE INVENTION

1. Field of the Invention

The present invention relates to a printer, an image printing system to which the printer is applied, and a method for printing a confidential document.

2. Description of the Related Art

An image printing system includes a computer and a printer connected to the computer by a communication interface.

The printer converts received print data into image data suitable for an engine and prints an image corresponding to the converted image data to supplied paper.

Recently, in order to increase the utilization efficiency of the printer, the printer is mainly used in a state of being connected to a plurality of user computers through a network as a communication interface. In a conventional printer, a print job order with respect to the received print data is determined by a first-in first-out method and the print jobs are performed according to the determined order. Therefore, a user sends the print data using the user computer, goes to a place where the printer is installed, waits for a previously received stand-by work to be completed, and takes the printed output of the user. When a printer is shared by many people, there are many chances of having a look at the printed outputs of others while the user waits for the printed output of the user to be output from the printer. Also, the user may take some or all printed outputs of others by mistake.

Considering the above situation, when a confidential document is printed using the printer shared by many people, it is difficult to maintain security with respect to the confidential document.

SUMMARY OF THE INVENTION

It is an objective of the present invention to provide a printer by which it is possible to prevent a confidential document from being exposed by others to setting the output conditions of printed matters with respect to a confidential document to be secured, an image printing system to which the printer is applied, and a method for printing the confidential document.

Accordingly, to achieve the above objective, there is provided a printer, comprising an input panel including a plurality of input keys, a controller for reading print type information sent through a communication interface together with print data and performing printing of a confidential print data file selected to be printed and received when a code that is the same as a secret code set in the received print type information is input through the input panel, and an engine controlled by the printer controller for printing an image corresponding to the print data to paper.

To achieve the above objective, there is provided an image printing system, comprising a computer having a printer driver for providing a print type menu on the screen of a display device so that a user can select either general printing or confidential printing with respect to a document file to be printed and outputting the selected print type information and a print data file obtained by converting the document file into a language for a printer through a communication interface and a printer for reading print type information transferred together with print data through go the communication interface and performing printing of a confidential print data file to be printed and received when a code input through an input device is the same as a secret code set in received print type information.

To achieve the above objective, there is provided a method for printing a confidential document in a printer, comprising the steps of (a) reading print type information received through a communication interface together with a print data file, (b) requesting a user to input a secret code when the print type information is set to be confidential printing, and (c) printing an image corresponding to the print data to paper when the secret code input by the user in the step (b) is the same as the secret code set in the print type information.

To achieve the above objective, there is provided a method for printing a confidential document in an image printing system including a computer and a printer connected to the computer by a communication interface, comprising the steps of (a) requesting a user to select either general printing or confidential printing of setting a secret code with respect to a document file to be printed on a print type selection menu screen using an input device when there is a print request command through the input device of the computer, (b) transferring information on the selected print type and a print data file obtained by converting the document file into a language for a printer to the printer, (c) reading information on the print type transferred to the printer together with the print data file and requesting a user to input a secret code with respect to a confidential print data file selected to be printed and received, (d) determining whether the input secret code is the same as the secret code previously set in the print type information, and (e) performing the printing of the received print data file when it is determined that the input secret code is the same as the secret code set in the step (a).

BRIEF DESCRIPTION OF THE DRAWING(S)

The above objective and advantages of the present invention will become more apparent by describing in detail a preferred embodiment thereof with reference to the attached drawings in which.

DESCRIPTION OF THE PREFERRED EMBODIMENT(S)

Figure 1:
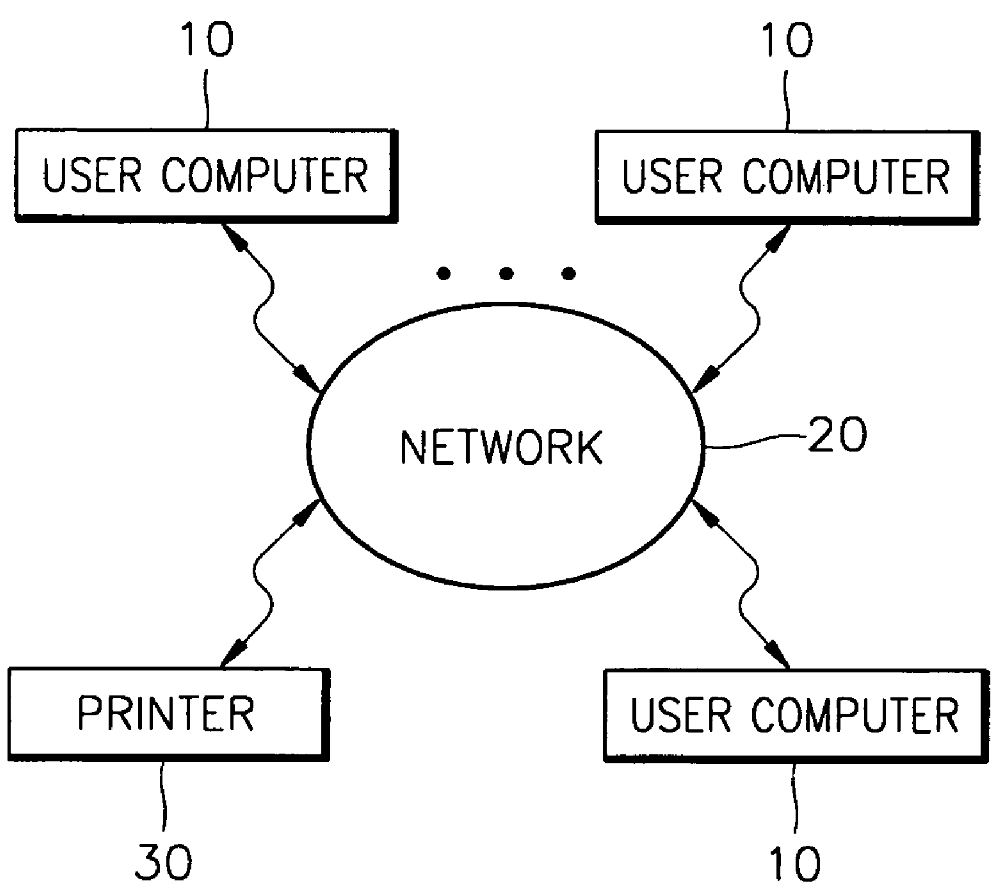
FIG. 1 is a block diagram showing an image printing system to which a printer according to the present invention is applied.

Referring to FIG. 1, a plurality of user computers 10 are connected to a printer 30 through a network 20.

Figure 2:
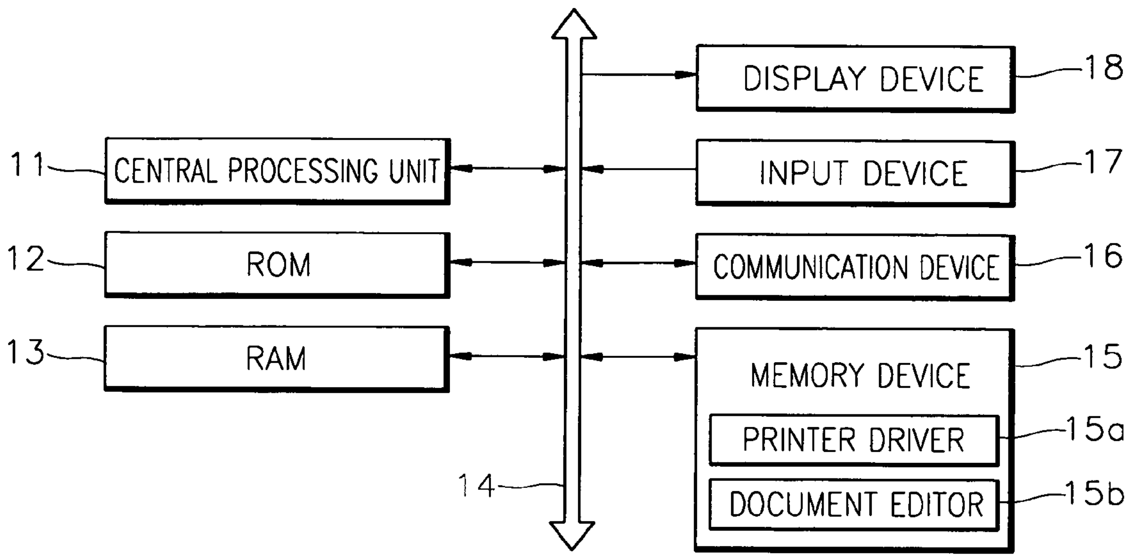
FIG. 2 is a block diagram showing the structure of a user computer of FIG. 1.

The user computer 10 includes a central processing unit (CPU) 11, a ROM 12, a RAM 13, a memory device 15, a communication device 16, an input device 17, and a display device 18, which are connected to one another by a bus 14, as shown in FIG. 2. The input device 17 may be a keyboard and/or a mouse. A network card can be an example of the communication device 16.

Various application programs such as a printer driver 15*a* and a document editor 15*b* are installed in the memory device 15.

The printer driver 15*a* provides a print type menu on the screen of the display device 18 so that a user can select either general printing or confidential printing with respect to a document file to be printed. When the print command is provided by the input device 17, the printer driver 15*a* transfers the selected print type information and the print data file obtained by converting the document file to be printed into a print language to the printer 30.

Figure 4:
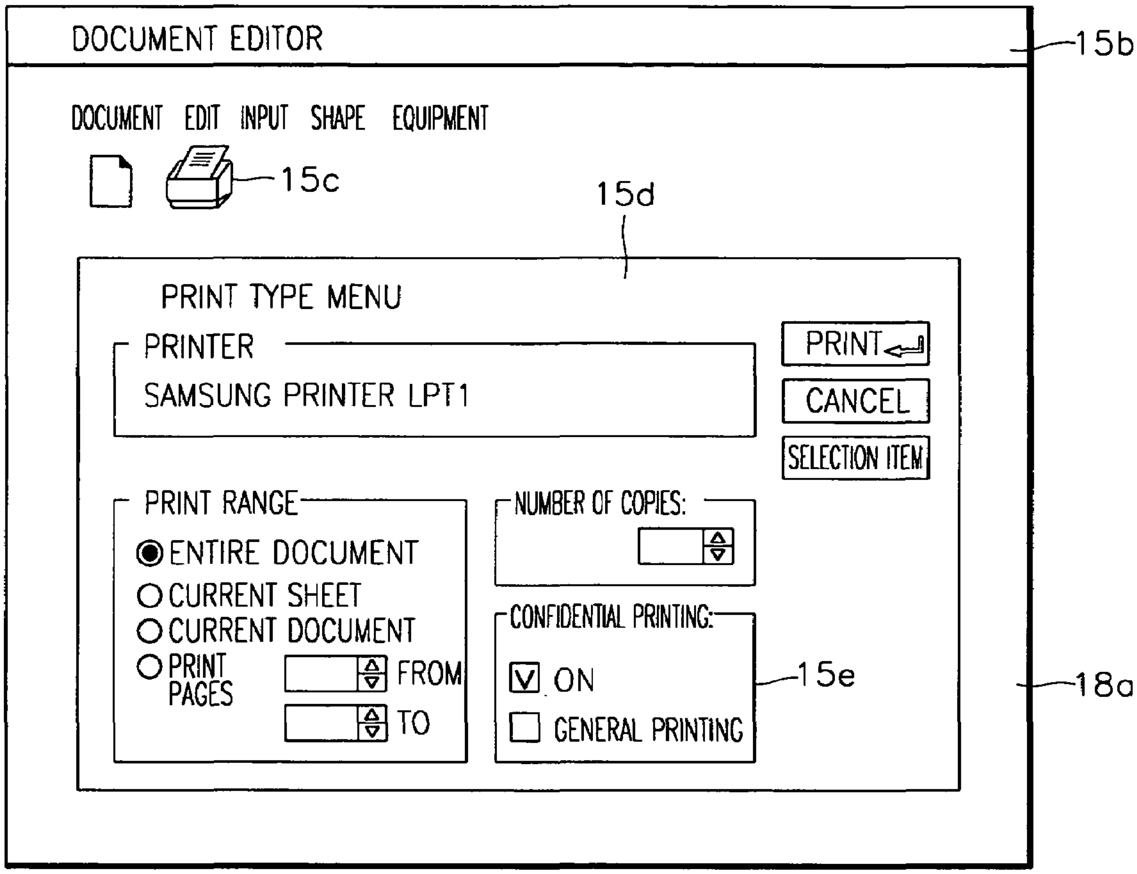
FIG. 4 shows an example of a print type selection menu provided on a screen of the display device of the user computer of FIG. 1.
Figure 5:
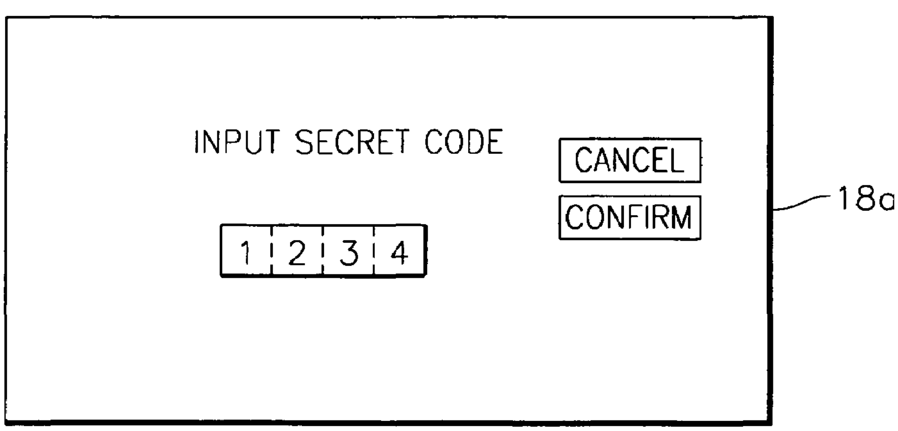
FIG. 5 shows an example of a secret code input request provided on the screen when confidential printing is selected in the print type selection menu of FIG. 4.

Referring to FIG. 4 showing an example of the print type selection menu 15*d* provided on the screen 18*a* of the display device 18 by the printer driver 15*a*, a selection list such as print range, number of copies, and confidential printing, with respect to the document file to be printed, is displayed on the screen 18*a*. In particular, the confidential printing selection list 15*e* is designed to be either turned on or turned off. When the confidential printing selection list 15*e* is turned off, general printing is set so that the printing is processed according to the work order as in the conventional technology. However, when the confidential printing selection list 15*e* is turned on, the user is requested to input an arbitrary secret code through the screen 18*a*, as shown in FIG. 5. The print type information selected and determined by the user using the input device 17 based on the print type selection menu 15*d* provided on the screen 18*a* is transferred to the printer 30 together with the print data file converted into the language for the printer.

Figure 3:
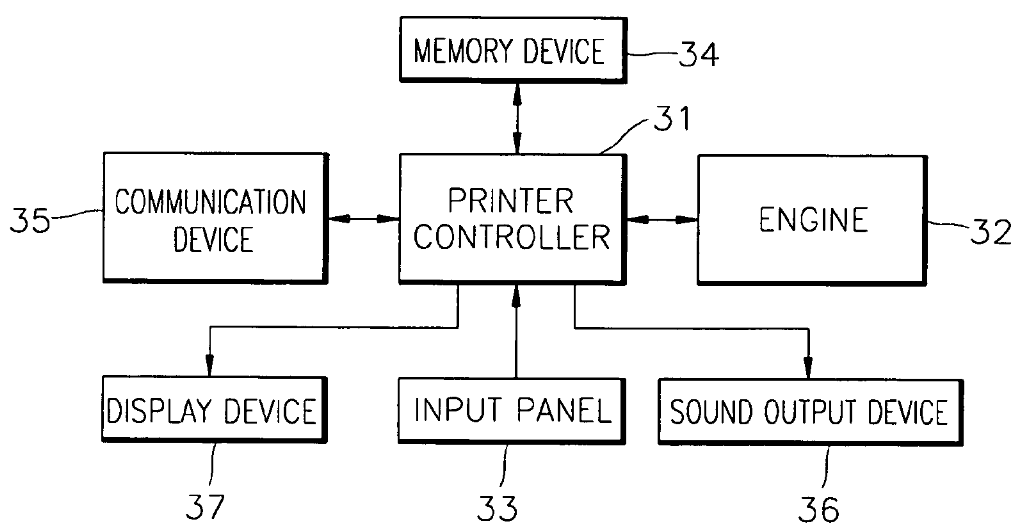
FIG. 3 is a block diagram showing the structure of the printer of FIG. 1.

The printer 30 connected to the computers 10 by the network 20 for reading the print type information received together with printer data and performing a print job corresponding to the set print type includes a printer controller 31, an engine 32, an input panel 33, a memory device 34, a communication device 35 such as a network card, a sound output device 36, and a display device 37, as shown in FIG. 3. A speaker or a buzzer is used as the sound output device 36.

An input panel 33 generally provided at the outside of a main frame includes a plurality of input keys for selecting various printing functions provided by the printer 30. The functions of the input keys are set so that the secret code can be input in a secret code input mode of requesting the printer controller 31 to input the secret code. A key input signal corresponding to the manipulation of the input key is output to the printer controller 31.

The memory device 34 is used for temporarily storing the print data file received together with the print type information and the image data converted for the engine 32 under the control of the printer controller 31.

The printer controller 31 reads data transferred from the computer 10 through the communication interface 20 and controls the printing of the engine 32 according to the set print type. The printer controller 31 informs the user through the display device 37 and/or the sound output device 36 that the print data file to be printed is a confidential document when the print data file selected to be currently printed is a confidential document. As an example, a message showing that the print data file to be currently printed is the confidential document is displayed on the display device 37. The sound output device 36 sounds an alarm. Then, when a secret code is input through the input panel 33, the printer controller 31 determines whether the input secret code is the same as the secret code set in the print type information. When the secret code set in the print type information is the same as the secret code input through the input panel 33, the printer controller 31 controls the engine 32 so that an image corresponding to the print data is printed to paper.

The engine 32 prints an image corresponding to image data transferred from the printer controller 31 and outputs the printed paper. The engine 32 has various structures corresponding to printing different methods. When the printing method is an electrophotography method, the engine 32 includes an optical scanner for scanning light to a photosensitive medium, a developer for developing an electrostatic latent image formed on a photosensitive medium with a developing material, and a transfer device for transferring the picture formed on the photosensitive medium by the developing material to supplied paper.

Figure 6:
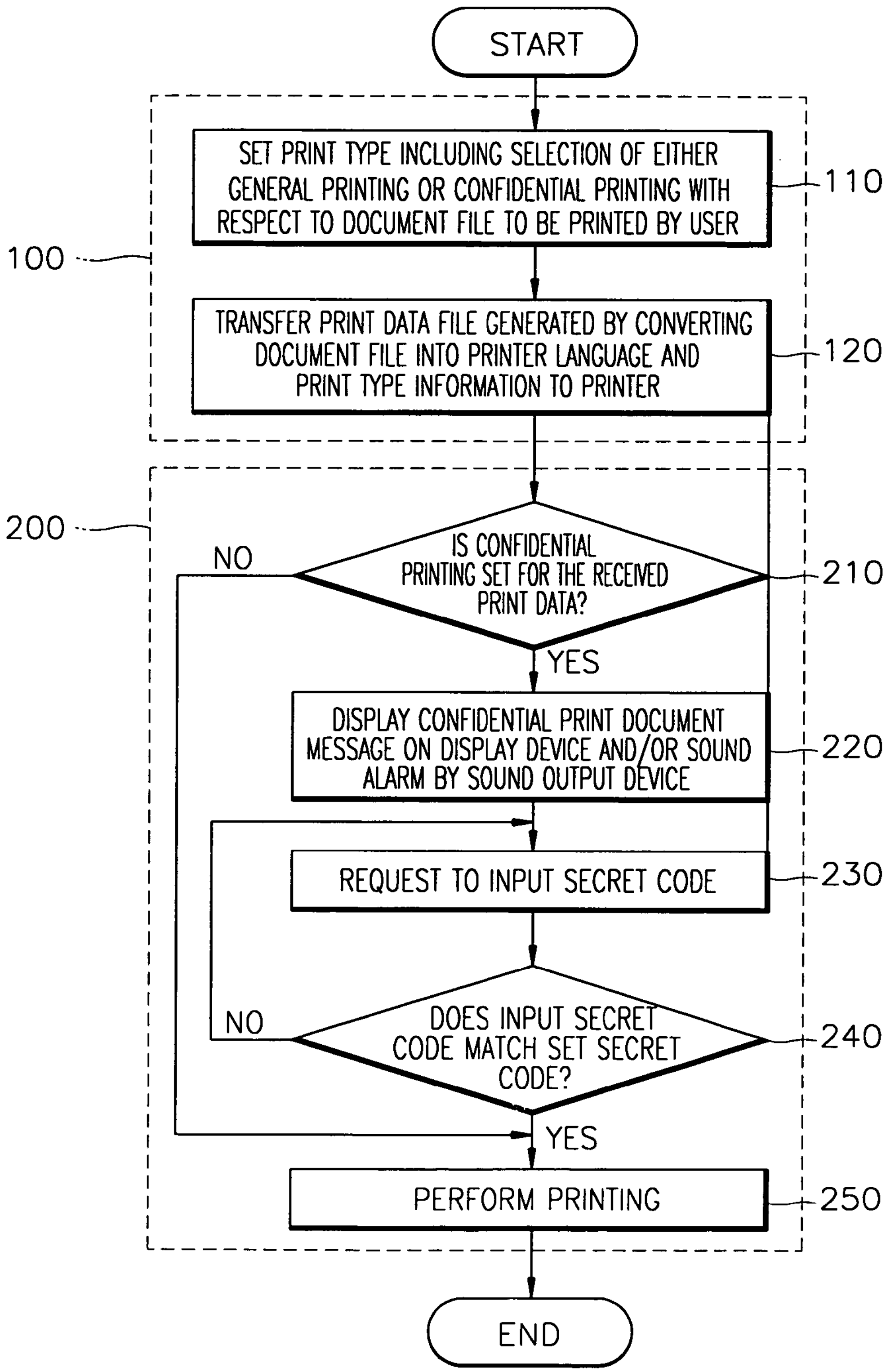
FIG. 6 is flowchart showing a confidential printing process according to the present invention.

Hereinafter, a method for printing a confidential document by an image printing system to which the printer according to the present invention is applied will be described with reference to FIG. 6. In FIG. 6, step 100 and step 200 are respectively performed in the computer and the printer.

First, the print type with respect to the document file to be printed is set using the computer 10 (step 110). The print type setting process is as follows. When the user clicks a print request icon 15*c* (FIG. 4) provided by the document editor 15*b* of the computer 10 using the mouse which is the input device 17, a print request signal is transmitted to the CPU 11. When the print request signal is received, the printer driver 15*a* is executed. The printer driver 15*a* provides the print type selection menu 15*d* on the screen 18*a* of the display device 18. Then, the user selects the print type using the input device 17, looking at the print type selection menu 15*d*. When the confidential printing item 15*e* is turned on, the printer driver 15*a* requests the user to input the arbitrary secret code through the display device 18. The secret code input through the input device 17 is stored in the memory device 15. When the confidential printing item 15*e* is turned off, the process of requesting the input of the secret code is omitted and the general print request information is recorded in the memory device 15. Other than these, selected information is recorded with respect to other parameters such as print range and number of copies. When the user clicks a window on a screen written as print, the setting of the print type is completed.

When the print type setting is completed, the printer driver 15*a* generates a print data file for the printer from the document file to be printed stored in the memory device 15 and transfers the set print type information and the print data file to the printer 30 (step 120).

In step 210, the printer controller 31 reads the transferred print type information together with the received print data file and determines whether there is a confidential document print request.

When it is determined that confidential document printing is not requested in the step 210, namely, the print type is determined to be a general printing request, the printing of the print data file is performed (step 250).

When it is determined that the print type with respect to the received print data file is set to be confidential printing in the step 210, the confidential print document message is displayed in the display device 37 and an alarm is sounded by the sound output device 36 (step 220). The confidential print document message displayed in the display device 37 and/or the alarm sounded by the sound output device 36 are for informing the user that requested the confidential document printing that the confidential document will now be printed.

After the confidential print document message and/or the alarm are/is generated, a message requesting the input of the secret code is displayed in the display device 37 (step 230).

In step 240, it is determined whether the input secret code is the same as the secret code recorded in the print type information.

In step 240, when the input secret code is the same as the secret code recorded in the print type information, the printing is performed (step 250). Namely, the printer controller 31 converts the print data file to be selected to be confidentially printed into the image data for the engine and outputs the image data to the engine 32. The engine 32 prints the image corresponding to the received image data to the paper and outputs the printed image.

When the input secret code is different from the secret code recorded in the print type information in the step 240, a message indicating that the input secret code does not match is displayed, returns to the step 230, and requests the input of the secret code again. It is preferable that the number of requests for re-input of the secret code is appropriately selected to be about two or three so that the delay in printing of print data transferred by others is not too long. When the input secret code is different from the secret code recorded in the print type information for the allowed number of the re-inputs of the secret code, is reached which is set as mentioned above, a secret code input error message is displayed and the secret document print data file which is to be printed is processed by an appropriate method such as deleting the secret document print data file or keeping the secret document print data file in the memory device 34.

As mentioned above, in the printer according to the present invention, the image printing system to which the printer is applied, and the method for printing the confidential document, the printer performs printing only when the secret code is the same as the previously set secret code input with respect to the confidential print data selected to be printed. Accordingly, it is possible to prevent the confidential print matter from being exposed to others.

What is claimed is:

1. A printer comprising:

an input unit;

a controller for reading print type information sent through a communication interface together with print data and determining whether a user selected a confidential print mode or a general print mode, and for performing, when the confidential print mode is selected, the printing of a confidential print data file received when a code that is the same as a secret code set in the received print type information is input through the input unit; and an engine controlled by the printer controller for printing an image corresponding to the print data to paper; and a sound output device for sounding an alarm;

wherein the printer controller controls the sound output device to sound the alarm when confidential print data to be printed is received.

2. The printer of claim 1, wherein, when received print data to be printed is the confidential print data, the printer controller displays a message, through a display device, that the received print data is a confidential document.

3. An image printing system, comprising:

a computer having a printer driver for providing a print type menu on the screen of a display device so that a user can select either general printing or confidential printing with respect to a document file to be printed and outputting the selected print type information and a print data file obtained by converting the document file into a language for a printer through a communication interface; and a printer for reading print type information transferred together with print data through the communication interface and performing printing of a confidential print data file to be printed and received when a code input through an input device is the same as a secret code set in received print type information; and a sound output device for sounding an alarm;

wherein the sound output device sounds the alarm when confidential print data to be printed is received.

4. The image printing system of claim 3, wherein the communication interface is a network for relaying the switching of information between a plurality of computers and at least one printer.

5. A method for printing a confidential document in a printer comprising:

reading print type information received through a communication interface together with a print data file and determining whether a user set the print type information to be either general printing or confidential printing with respect to the document file to be printed;

requesting a user to input a secret code if the print type information is set to be confidential printing;

printing an image corresponding to the print data to paper when the secret code input by the user is the same as the secret code set in the print type information; and when the received print type information is set to be confidential printing in the reading step (a), sounding an alarm for informing this fact to the user.

6. A method for printing a confidential document in an image printing system including a computer and a printer connected to the computer by a communication interface comprising:

requesting a user to select either general printing or confidential printing of setting a secret code with respect to a document file to be printed on a print type selection menu screen using an input device when there is a print request command through the input device of the computer;

transferring information, on the selected print type and a print data file obtained by converting the document file into a language for the printer, to the printer;

reading information on the print type transferred to the printer together with the print data file and requesting the user to input a secret code with respect to a confidential print data file selected to be printed and received;

determining whether the input secret code is the same as the secret code previously set in the print type information;

performing the printing of the received print data file when it is determined that the input secret code is the same as the secret code; and when the print type information transferred to the printer and read is set to be a confidential printing, sounding an alarm for informing this fact to the user.

* * * * *